(12) United States Patent
Chuang et al.

(10) Patent No.: US 8,092,069 B2
(45) Date of Patent: Jan. 10, 2012

(54) BACKLIGHT MODULE AND FRAME THEREOF

(75) Inventors: Yung-Pin Chuang, Hsin-Chu (TW); Szu-Han Li, Hsin-Chu (TW); Ching-Fu Tien, Hsin-Chu (TW); Keng-Ju Liu, Hsin-chu (TW); Cheng-Hua Tien, Hsin-Chu (TW); Tsung-Hsien Hsieh, Hsin-Chu (TW)

(73) Assignee: AU Optronics Corp., Hsin-chu (TW)

( * ) Notice: Subject to any disclaimer, the term of this patent is extended or adjusted under 35 U.S.C. 154(b) by 277 days.

(21) Appl. No.: 12/285,816

(22) Filed: Oct. 15, 2008

(65) Prior Publication Data

US 2009/0115930 A1 May 7, 2009

(30) Foreign Application Priority Data

Oct. 17, 2007 (TW) .............................. 96138836 A (51) Int. Cl.
*F21V 7/10* (2006.01)
*F21V 17/10* (2006.01)

(52) U.S. Cl. ........ 362/633; 362/634; 362/97.1; 362/433

(58) Field of Classification Search .......... 362/632–634, 362/97.1, 97.2, 97.4, 240, 246, 433, 440, 362/444, 445, 455
See application file for complete search history.

(56) References Cited

U.S. PATENT DOCUMENTS

| | | | | |
|---|---|---|---|---|
| 6,046,785 A | * | 4/2000 | Won ................................ | 349/58 |
| 6,507,377 B1 | * | 1/2003 | Jung ................................ | 349/60 |
| 6,874,900 B2 | * | 4/2005 | Hsieh ............................... | 362/26 |
| 7,344,294 B2 | * | 3/2008 | Hsieh et al. ..................... | 362/633 |
| 7,445,369 B2 | * | 11/2008 | Yu et al. ......................... | 362/612 |
| 7,517,135 B2 | * | 4/2009 | Yu ................................... | 362/633 |
| 2003/0164903 A1 | * | 9/2003 | Saito et al. ..................... | 349/58 |
| 2006/0039132 A1 | * | 2/2006 | Chen ............................... | 362/97 |
| 2006/0114689 A1 | * | 6/2006 | Chang et al. .................... | 362/561 |
| 2006/0203465 A1 | * | 9/2006 | Chang et al. .................... | 362/29 |
| 2006/0279946 A1 | * | 12/2006 | Park et al. ...................... | 362/97 |
| 2008/0030652 A1 | * | 2/2008 | Zhuang et al. ................. | 349/65 |
| 2008/0106669 A1 | * | 5/2008 | Tsai et al. ...................... | 349/58 |

FOREIGN PATENT DOCUMENTS

TW        2007 19041        5/2007

OTHER PUBLICATIONS

Office Action issued on Sep. 15, 2011 in corresponding Taiwanese application No. 096138836.

* cited by examiner

*Primary Examiner* — Ismael Negron
(74) *Attorney, Agent, or Firm* — Bacon & Thomas, PLLC (57) ABSTRACT

A backlight module and a frame thereof are provided, which comprises an outer frame, an elastic side frame, a connecting arm and a cantilever. Here, the elastic side frame is disposed on the at least one side of the outer frame. The connecting arm is connected to a surface of the elastic side frame. The cantilever is disposed on the connecting arm, and formed a first space with the elastic side frame.

15 Claims, 9 Drawing Sheets

LS-DYNA USER INPUT
Time = 0.00099996
Contours of Maximum Principal Stress
min=-34.8233, at elem# 13308
max=58.0618, at elem# 18595

BACKLIGHT MODULE AND FRAME THEREOF

BACKGROUND OF THE INVENTION

1. Field of the Invention

The present invention relates to a backlight module, and more particularly, to a backlight module having a frame adapted for protecting optical films.

2. Description of Related Art

Nowadays, liquid crystal displays (LCDs) have become very common in the fields of information and electrical appliances, and thus are widely popular among consumers due to merits of low price and matured manufacturing techniques.

LCDs adopt a passive-display measure, i.e. relying on illumination of a backlight module lamp. An LCD primarily consists of a liquid crystal display panel and a backlight module. The backlight module provides the panel uniform and sufficient light, and is one of the key optical modules for an LCD. In a traditional backlight module, light is transmitted from a lamp, through a light guide, to an optical film (for example, a diffuser), and then to the LCD panel.

However, the cost for manufacturing optical films of the backlight modules is by no means low, yet optical films have a great influence on the quality of LCDs. Factors affecting manufacture of desirable backlight modules reside in positioning, supporting and expansion rate of optical films. It is significant to protect optical films so as to prevent them from fracture under impact.

Figure 1:
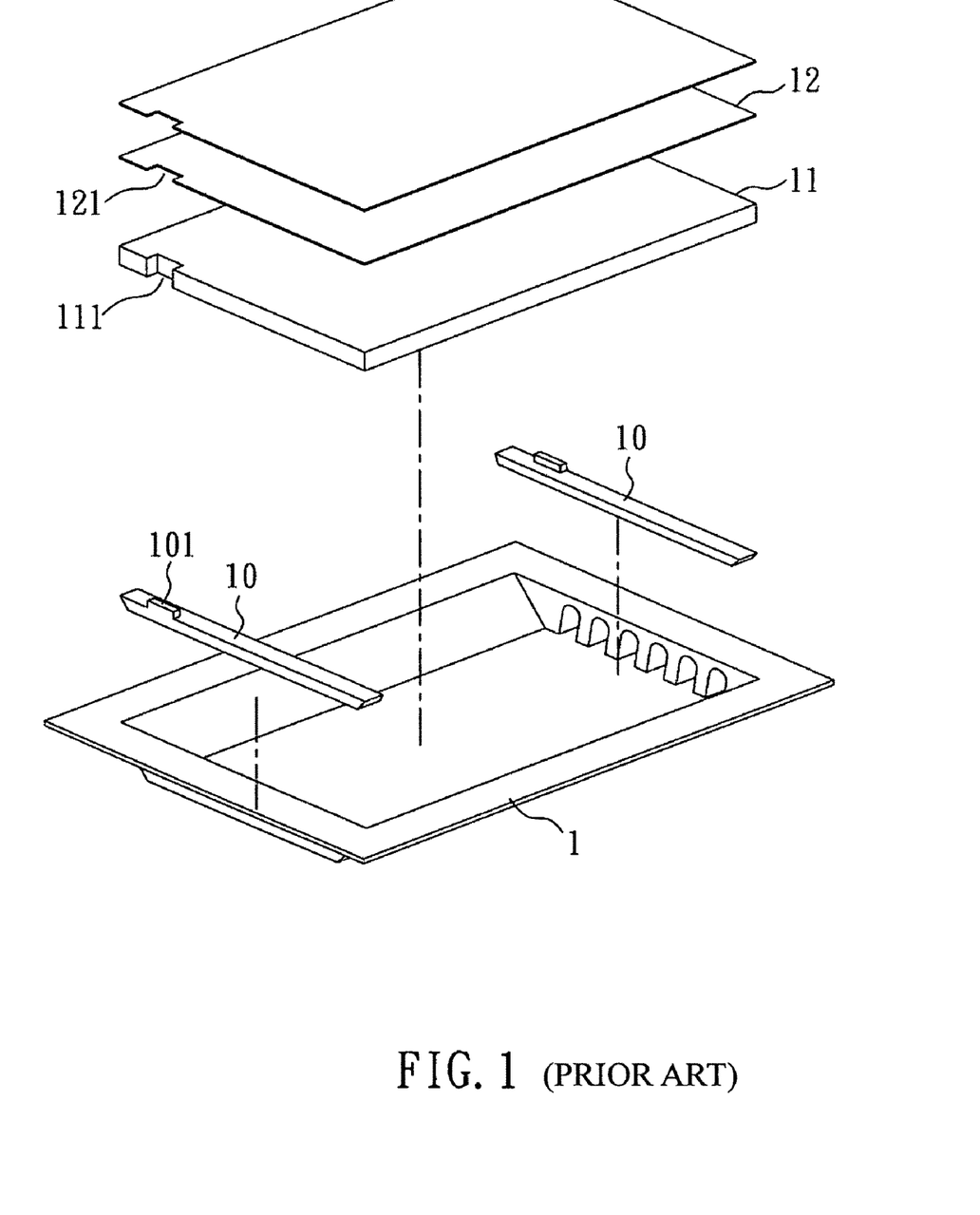
FIG. 1 is an exploded view illustrating a conventional backlight module.
Figure 2A:
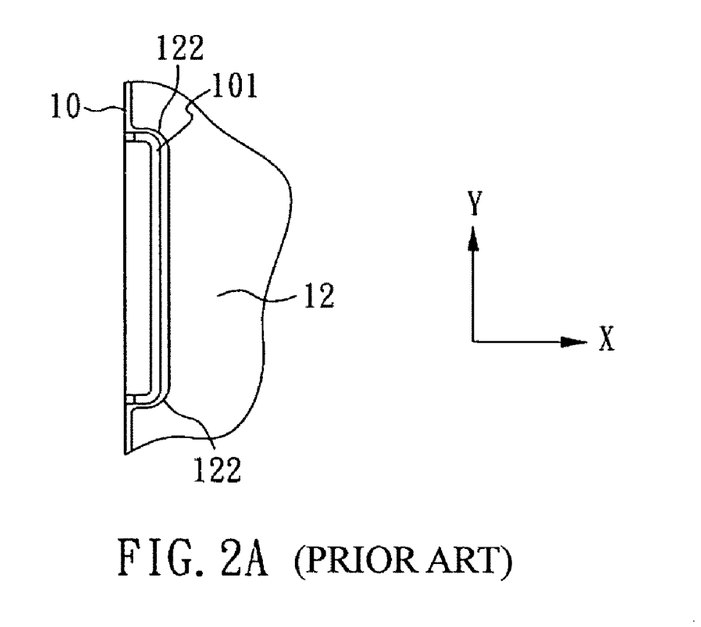
FIG. 2A is an enlarged top view illustrating an engagement of part of an optical film and an elastic side frame on the conventional backlight module.
Figure 2B:
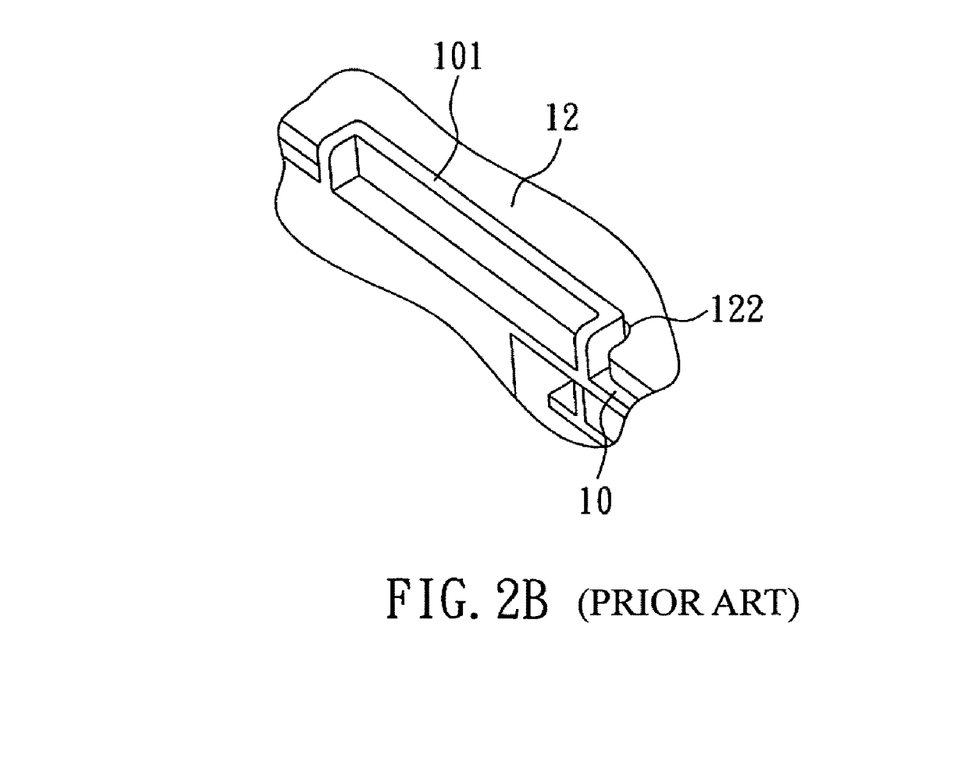
FIG. 2B is a perspective view illustrating the engagement of part of the optical film and the elastic side frame on the conventional backlight module shown in FIG. 2A.

Referring to FIG. 1, an exploded view illustrating a conventional backlight module, the backlight module comprises an outer frame 1, two elastic side frames 10 each disposed at one side of the outer frame 1, respectively, and a light guide 11 and optical films 12 supported at top of the elastic side frame 10. The elastic side frame 10 has a rib 101, and the light guide 11 and the optical film 12 are respectively provided with a recess 111, 121 at a location corresponding to the rib 101. The rib 101 of the elastic side frame 10 can be configured as the one shown in FIGS. 2A and 2B, i.e., an enlarged top view and a perspective view illustrating engagement of the optical film 12 and the rib 101 on the conventional backlight module. In the conventional backlight module, upon a shock or impact, an external force from Y direction makes the elastic side frame 10 incur a stress and in particular, a stress occurs at the corner 122 of the recess 121 of the optical film 12. Furthermore, upon an external force from an X direction, a stress will similarly occur at the corner 122 of the recess 121 of the optical film 12. As a result, the optical film 12 fractures due to the shock or impact. It, therefore, becomes an issue as to how to prevent the optical films of the backlight modules from fracture so as to raise yield rate of the LCDs.

SUMMARY OF THE INVENTION

According to the present invention, a backlight module frame includes an outer frame, an elastic side frame, a connecting arm, and at least one cantilever. The elastic side frame is disposed on at least one side of the outer frame; the connecting arm is connected to a surface of the elastic side frame; and the cantilever is disposed on the connecting arm, where a first spacing is formed between the cantilever and the elastic side frame.

Still according to the present invention, a backlight module includes an outer frame, an elastic side frame, a connecting arm, at least one cantilever, a plurality of lamps, and at least one optical film. The elastic side frame is disposed on at least one side of the outer frame; the connecting arm is connected to a surface of the elastic side frame; the at least one cantilever is disposed on the connecting arm, wherein a first spacing is formed between the cantilever and the elastic side frame. The connecting arm is connected with the elastic side frame and the at least one cantilever so as to maintain the first spacing. The plural lamps are disposed on the outer frame; and the at least one optical film has at least one recess, wherein the at least one optical film is disposed on the top of the elastic side frame and the film recess envelops the at least one cantilever.

In the backlight module according to the present invention, the lamp primarily owns its merit in providing sufficient brightness for the backlight module, where the lamp can be cold cathode fluorescent lamp (CCFL) or light emitting diode (LED).

According to the present invention, at least one end side of the cantilever has an extension portion, and a second spacing is formed between the extension portion and the top of the elastic side frame. Therefore, the stress at Y direction can be reduced by such extension portion. Also, the cantilever itself is capable of stress release at Y direction of the elastic side frame. The at least one cantilever has a recess, and a third spacing is formed between the cantilever and the connecting arm, thus the stress at X direction of the elastic side frame can be reduced. Besides, two L-shaped structures are formed in the cantilever with the formation of the recess, such that the two L-shaped structures may ease the stress at X direction of the elastic side frame too. The cantilever of the present invention disposes mainly on the top of the elastic side frame in order to release the stresses from both X and Y direction and to provide a protection to the optical films.

Meanwhile, the optical film, disposed on the top of the elastic side frame and having a recess, of the present invention can be a prism sheet, a diffuser plate, a reflector plate, or a protecting film.

Furthermore, the elastic side frame can be simultaneously produced with the cantilever and the connecting arm by using a single-mold injection method. The elastic side frame may be made of metal, plastic, or complex materials. Polyester is preferred when a plastic is selected.

Subsequently, the elastic side frame of the present invention may be disposed at two sides of the outer frame, in which the cantilever locating at both sides of the outer frame can be one or more, and the cantilevers at both sides of the outer frame can be disposed in a symmetrical way or an asymmetrical arrangement.

The material of the outer frame is not limited but preferably is metal, plastic, or complex materials.

The backlight module of the present invention is preferably a bottom lighting backlight module.

When optical films are placed on the top of the elastic side frame, the cantilever provided may serve as a cushion, a proof-thinking device (error-free device), and a positioning device simultaneously. According to the present invention, the safety of the optical films is particularly secured, thus the original shape of the optical films is maintained and a good optical performance is easily provided by those optical films. By using the elastic side frame of the present invention, outer forces applied to the optical film are uniformly distributed, thus the stresses are efficiently reduced, and the producing yield of the LCD devices can be improved. Furthermore, the cost for manufacturing LCD devices can be lowered.

Other objects, advantages, and novel features of the invention will become more apparent from the following detailed description when taken in conjunction with the accompanying drawings.

DETAILED DESCRIPTION OF THE PREFERRED EMBODIMENT

Specific embodiments will be proposed as follows for implementation of the present invention. It is understood that one skilled in the art can readily perceive advantages and functions of the present invention in reference to the description hereinafter. The present invention can be practiced through various embodiments, where details described below can be modified in terms of different views and implementations within the spirit of the present invention.

In the drawings illustrating the embodiments of the present invention schematic views are presented. Nevertheless, the drawings only serve to show the elements relevant to the present invention, despite that configuration of the elements may not necessarily be similar to that as practically implemented. Besides, the number of elements or shapes thereof as practically implemented are optionally proportioned, though may be more complex in a real configuration of elements.

Embodiment 1

Figure 3:
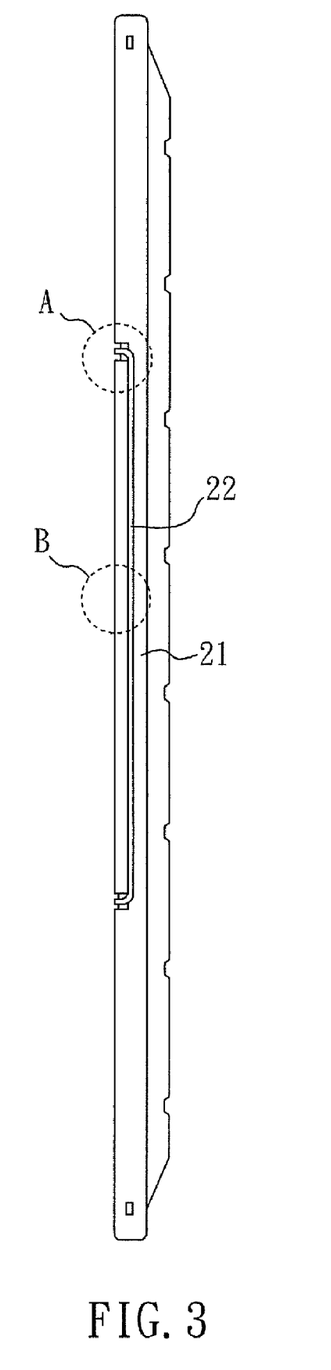
FIG. 3 is a schematic view illustrating an elastic side frame according to the present invention.
Figure 4:
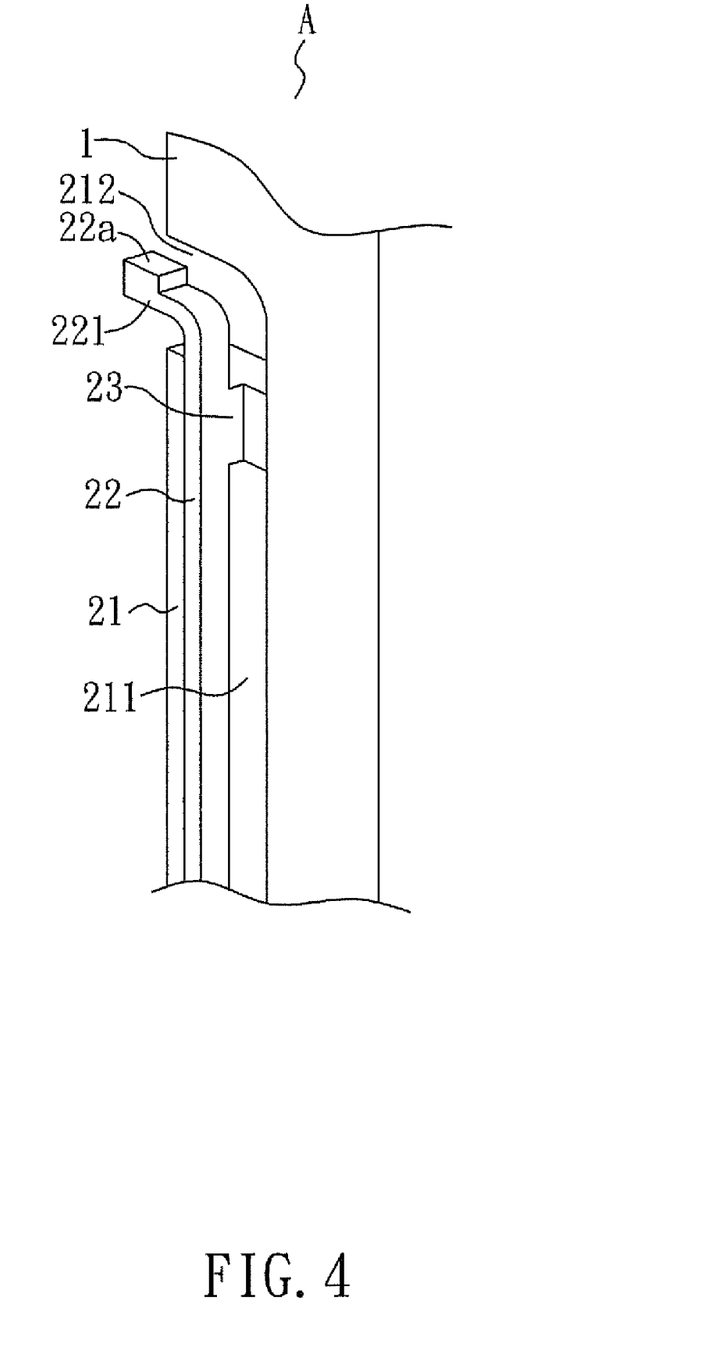
FIG. 4 is an enlarged perspective view illustrating part of the elastic side frame according to Embodiment 1 of the present invention, as circled A in FIG. 3 (Area A)
Figure 5:
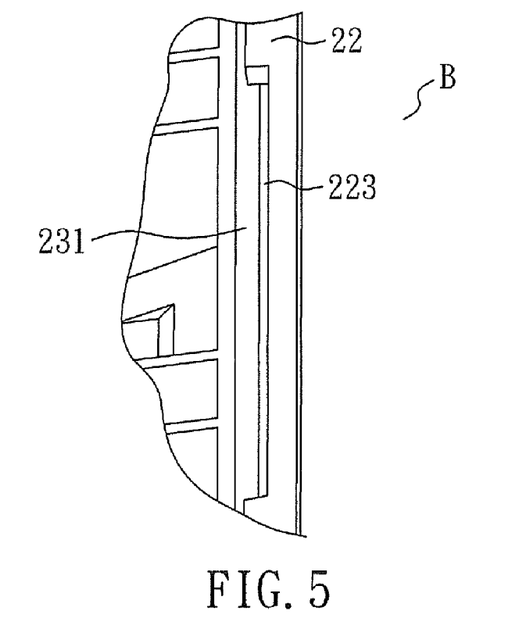
FIG. 5 is an enlarged perspective view illustrating part of the elastic side frame according to Embodiment 1 of the present invention, as circled B in FIG. 3(Area B)
Figure 12:
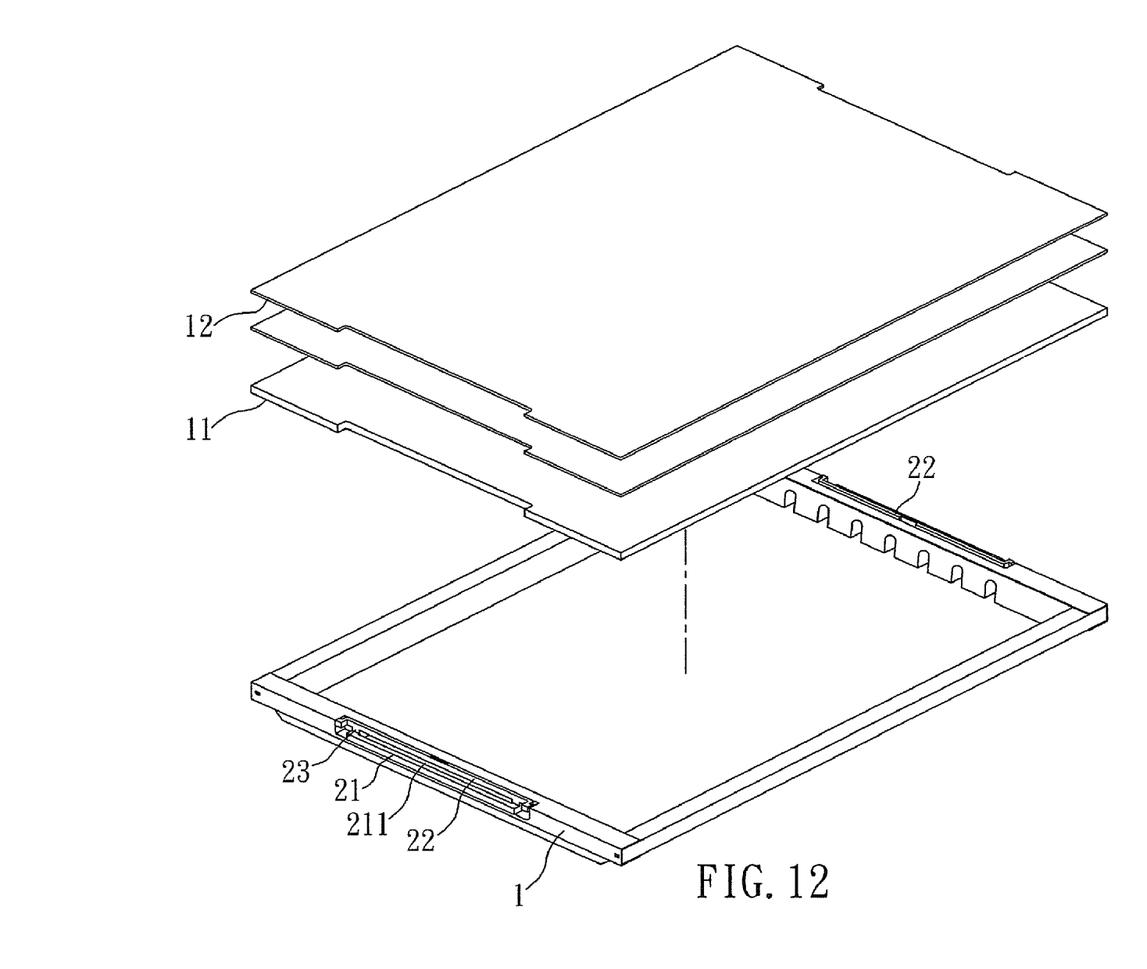
FIG. 12 is an exploded view illustrating a backlight module of Embodiment 1 of the present invention.

Embodiment 1 of the present invention is to provide a backlight module frame and a backlight module in use of the frame. Now referring to FIGS. 3 to 5, an elastic side frame 21, made of polyester, includes a cantilever 22, and a connecting arm 23. Also referring with FIG. 12, the backlight module having the elastic side frame 21 of the present Embodiment 1 is presented. As shown in FIG. 4, the connecting arm 23 is fixed to a surface of the elastic side frame 21, and the cantilever 22 is disposed on the connecting arm 23 and is located above the elastic side frame 21, where a first spacing 211 is formed between the cantilever 22 and the elastic side frame 21. The cantilever 22, disposed above the elastic side frame 21, has two extension portions 221 (each independently having a protrusion 22a) at the two end sides of the cantilever 22, where each of the extensions' protrusion 22a and the elastic side frame 21 form a second spacing 212. In other words, the extension portions 221 are suspended from the cantilever 22, such that the cantilever 22 has an L-shaped structure at Area A. The cantilever 22 at Area A act as a cushion for the elastic side frame 21 to buffer against the stress from Y-direction. Further, as shown in FIGS. 3 and 5, a recess 223 is formed at Area B of the cantilever 22, and a third spacing 231 is formed at B Area between the cantilever 22 and the connecting arm 23. The cantilever 22 at Area B serves the elastic side frame 21 with a buffer against an X-direction stress. In the present embodiment, the elastic side frame 21, the cantilever 22, and the connecting arm 23 are integrally made with single-mold injection. Hence, stresses on the cantilever 22 and optical films will be reduced because of the second spacing 212 formed between the elastic side frame 21 and the cantilever 22, and the third spacing 231 formed between the cantilever 22 and the connecting arm 23. The cantilever 22, disposed above the elastic side frame 21, is not limited to only singular, but rather can be plural. In addition, the cantilevers 22, each disposed on the elastic side frame 21 which is to be disposed one at each side of the outer frame 1 shown in FIG. 12, may or may not be symmetric with each other.

In the present embodiment, a backlight module may be provided. In this respect, FIG. 12 can be referenced as an exploded view of the backlight module, where, instead, the elastic side frame 21 is disposed at each side of the outer frame. There are plural lamps (not shown) arranged on the outer frame 1, where the lamps can be CCFLs or LEDs. In the present embodiment, the lamps are CCFLs. A light guide 11 and optical films 12 are disposed, in sequence, on the top of the elastic side frame 21. The light guide 11 and the optical film 12 are each provided with a recess 111, 121 at a location corresponding to the cantilevers 22 according to the present embodiment. The light guide recess 111 and the optical film recess 121 envelop the cantilever 22. Eventually, a backlight module according to the present embodiment is accomplished.

Embodiment 2

Figure 6:
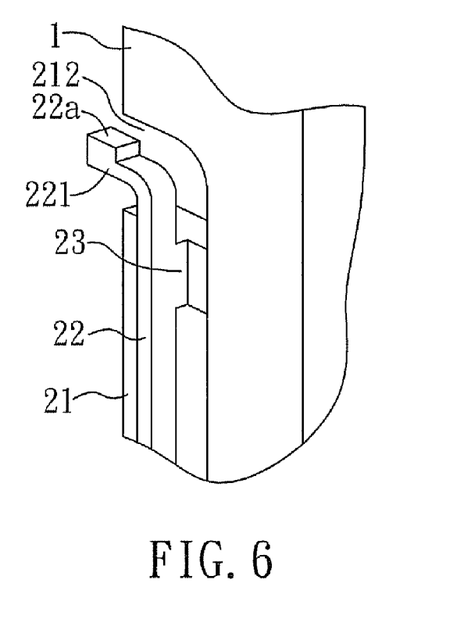
FIG. 6 is an enlarged perspective view illustrating Area A of the elastic side frame according to Embodiment 2 of the present invention.
Figure 7:
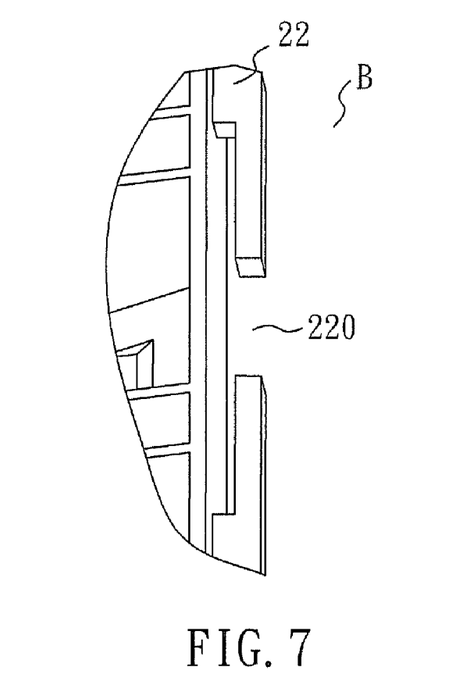
FIG. 7 is an enlarged perspective view illustrating Area B of the elastic side frame according to Embodiment 2 of the present invention.

Now reference is made to FIGS. 6 and 7, which are schematic views of Area A and Area B of the cantilever 22 shown in FIG. 3, respectively. As illustrated in FIG. 6, a second spacing 212 is formed between the extension portion 221 and the elastic side frame 21; the connecting arm 23 is elongated and connecting with the cantilever 22. Similarly as in Embodiment 1, the cantilever 22 at Area A of the present Embodiment act as a cushion for the elastic side frame 21 to buffer against the stress from Y-direction. Referring with FIG. 7, the cantilever 22 at Area B is cut off and forms a break 220, thus a pair of L-shaped structures at Area B is formed. Such L-shaped structure at Area B may provide a cushion for the elastic side frame 21 against the stress from X-direction. Also, the elastic side frame 21 and the extension portion 221 are integrally made with single-mold injection. Thereby, such cantilever 22 is able to reduce the deformation or damage otherwise caused by the outer stresses.

Comparative Embodiment 1

Figure 8:
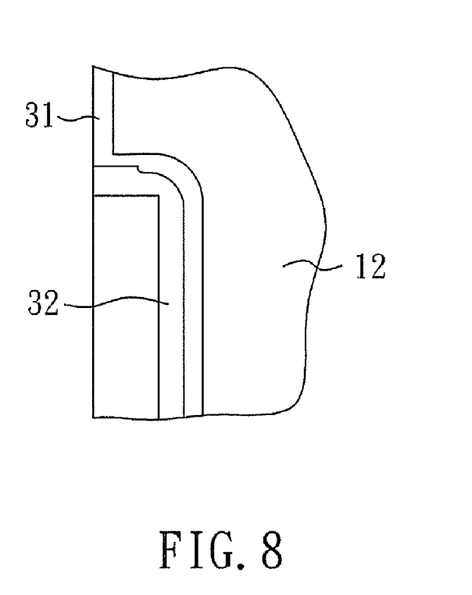
FIG. 8 is an upper view of the elastic side frame according to the Comparative Embodiment of the present invention.

As shown in FIG. 8, an elastic side frame of the present Comparative Embodiment is presented. The material of the elastic side frame 31 of the present Comparative Embodiment is the same as that of the Embodiment 1. The rib 32 locating on the elastic side frame 31 is different from the cantilever 22 of the Embodiment 1 and 2. Though the elastic side frame 31 is the same as the elastic side frame 21 of the Embodiments 1 and 2, the difference is that there is no such third spacing 231 and second spacing 212 formed in the present Comparative Embodiment as in the Embodiments 1 and 2. That is, the rib 32 connects to the elastic side frame 31 entirely without any spacing.

Experiment Embodiment

Figure 9A:
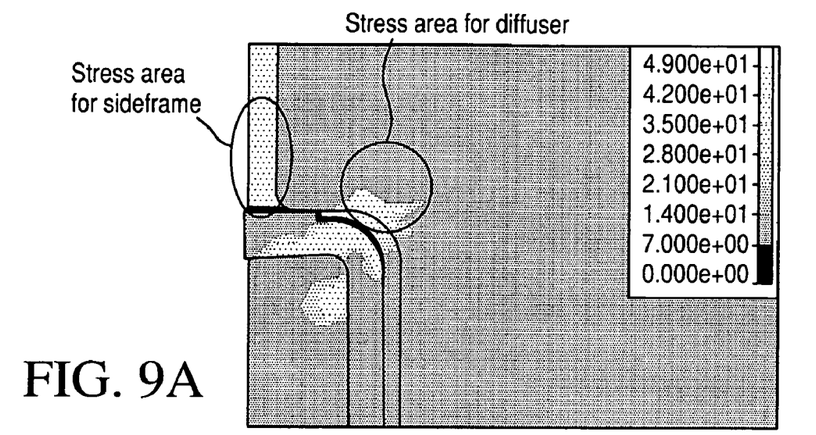
FIGS. 9A, 9B, and 9C are experimental results of the stress received at a Y direction after being exposed to shock from an outer force, and each of FIGS. 9A, 9B, and 9C represents the Comparative Embodiment, Embodiment 1, and Embodiment 2, respectively.
Figure 9B:
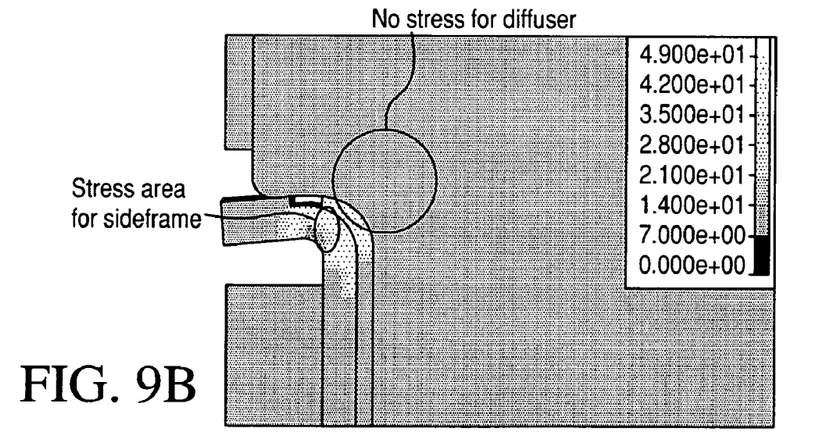
Figure 9C:
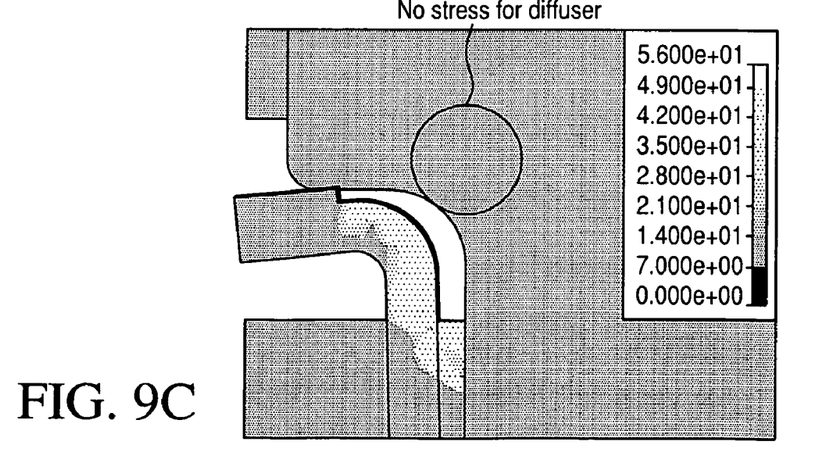

FIG. 9A shows an experimental result of the stress received at a Y direction after being exposed to shock from an outer force according to the Comparative Embodiment of the present invention. FIGS. 9B and 9C are experimental results of the stress received at a Y direction after being exposed to shock from an outer force according to the Embodiment 1 and Embodiment 2, respectively. With reference to FIGS. 9A, 9B, and 9C, the dark color and light color observed represent a small force and a large force received, respectively. A diffuser plate is used here to be an optical film in the experiment. It can be seen in FIG. 9A, which represents the experimental result of the Comparative Embodiment (without an outer frame as that of the present invention), there is still some stress received by the diffuser plate and this may cause breaks in the diffuser plate when an outer force is applied thereto. Meanwhile, in regard to the diffuser plate of the Embodiment 1 and Embodiment 2 respectively, the testing results in FIGS. 9B and 9C show no stress received at a Y direction, which means the safety of the diffuser plate is guaranteed.

Figure 10A:
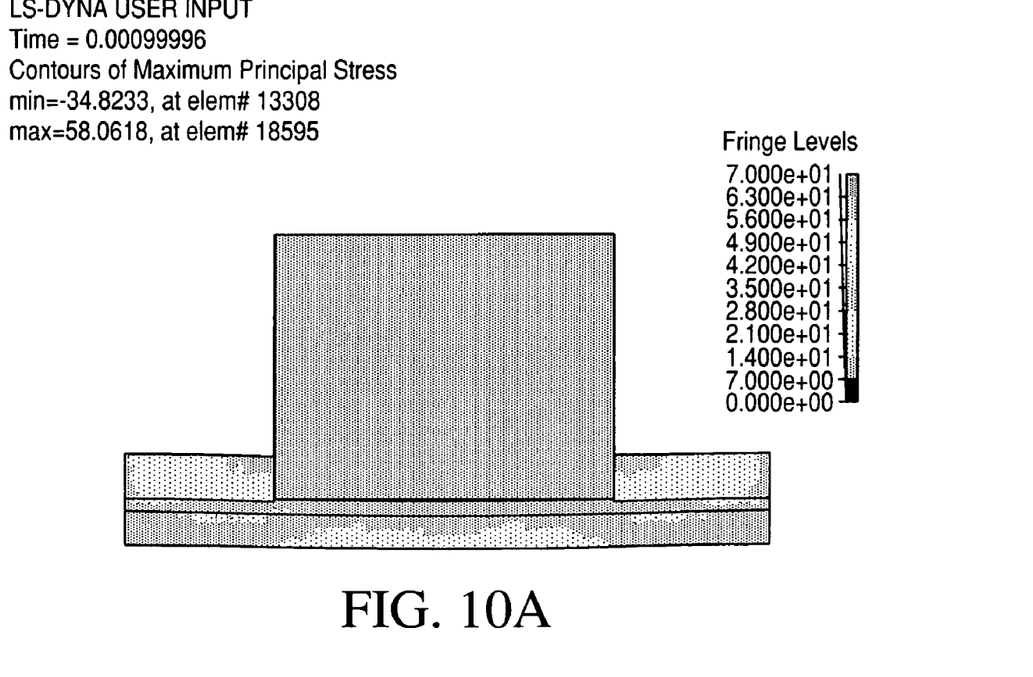
FIGS. 10A and 10B are results of the stress received at an X direction after being exposed to shock from an outer force, and each of FIGS. 10A and 10B represents the Comparative Embodiment and a preferred embodiment of the present invention, respectively.
Figure 10B:
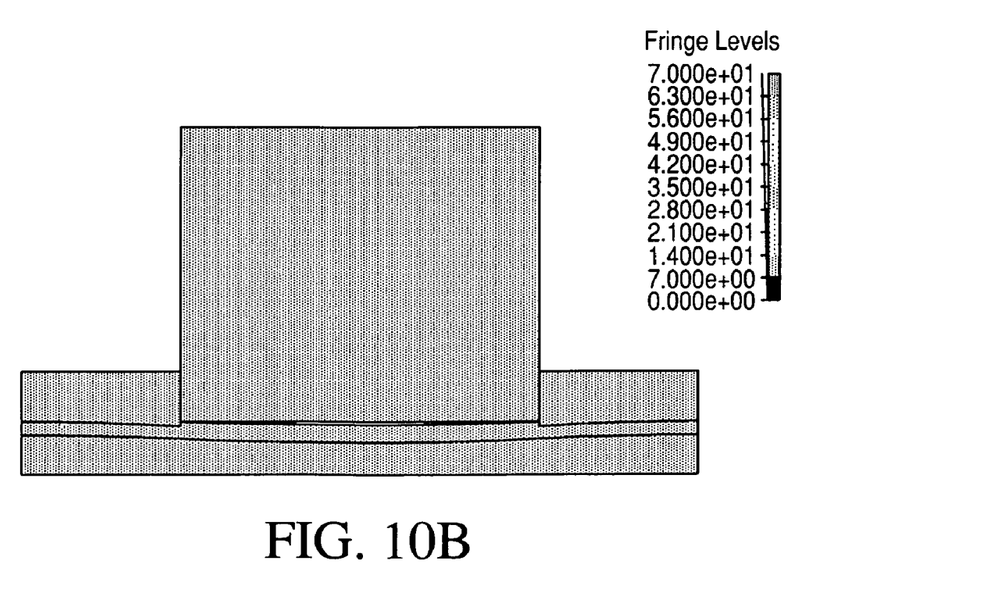
Figure 11A:
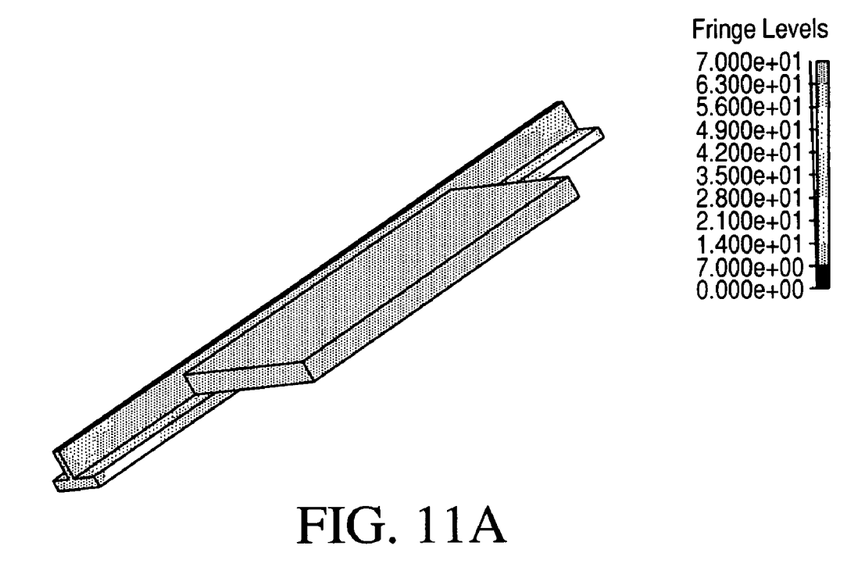
FIGS. 11A and 11B are results of the stress received at an X direction after being exposed to shock from an outer force, and each of FIGS. 11A and 11B represents the Comparative Embodiment and a preferred embodiment of the present invention, respectively.
Figure 11B:
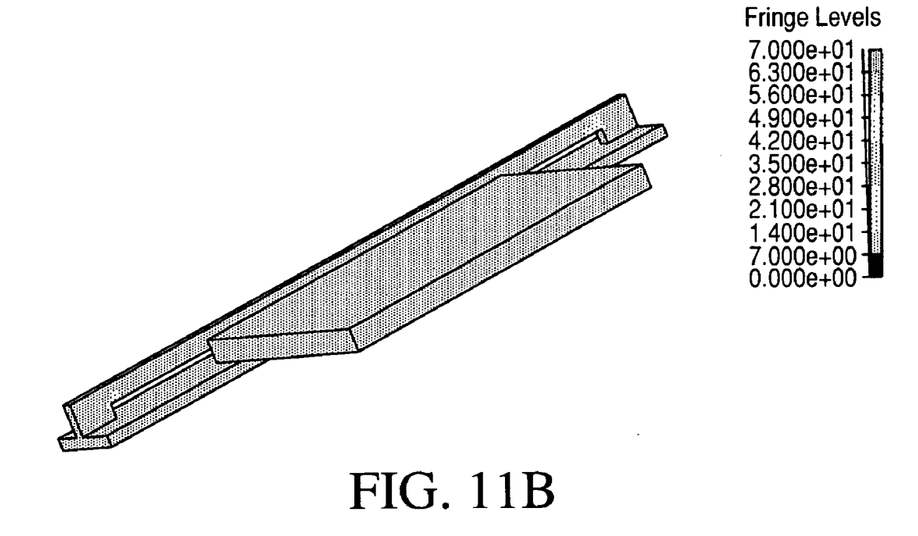

With reference to FIGS. 10A and 10B, in which results of the stress received at an X direction after are exposed to shock from an outer force of the Comparative Embodiment and a preferred embodiment (e.g. Embodiment 1 and 2) of the present invention are shown. Accordingly, FIGS. 11A and 11B are side views related to FIGS. 10A and 10B respectively. In the same way as 9A-9C, the dark color and light color observed in the figures represent a small force and a large force received, respectively. Thus it can be seen that, as for the elastic side frame, stresses occur when an outer force is applied from the X direction into the elastic side frame in the Comparative Embodiment. Conversely, stresses are effectively reduced in the elastic side frame of the backlight module according to the present invention. Therefore, the backlight module having the frame according to the present invention is able to pass mechanical test with more critical conditions and be applied to a large area display panel.

As demonstrated above, elastic side frames having cantilevers are provided in the backlight module and the frame thereof according to the present invention, thus stresses can be reduced and the safety of the optical films in the backlight module are more guaranteed. Meanwhile, the process of providing the elastic side frame and the cantilever by single-mold injection may achieve the requirement of low cost. Furthermore, the elastic side frame of the present invention may resist a greater outer stress applied thereto, therefore, it is able to pass mechanical test with more critical conditions and be applied to a large area display panel, and the producing yield of the LCD devices may be improved.

Although the present invention has been explained in relation to its preferred embodiment, it is to be understood that many other possible modifications and variations can be made without departing from the scope of the invention as hereinafter claimed.

What is claimed is:

1. A backlight module frame for receiving at least one optical film having at least one recess, comprising:
an outer frame;
an elastic side frame disposed on at least one side of the outer frame;
a connecting arm disposed on the top of the elastic side frame; and
at least one cantilever disposed on the connecting arm, a first spacing being formed between the cantilever and the elastic side frame, the at least one cantilever extending from the elastic side frame in a vertical direction substantially perpendicular to a major surface of the optical film, when the at least one optical film is disposed on the top of the elastic side frame and the recess of the optical film envelops the at least one cantilever.

2. A backlight module comprising:
an outer frame;
an elastic side frame disposed on at least one side of the outer frame;
a connecting arm disposed on the top of the elastic side frame;
at least one cantilever disposed on the connecting arm, the cantilever having at least one extension portion with an L-shape structure located at an end side of the cantilever, the at least one extension portion being extended from the cantilever, wherein a first spacing is formed between the cantilever and the elastic side frame and a second spacing is formed between the extension portion and the elastic side frame; and
at least one optical film having at least one recess, the at least one optical film being disposed over the top of the elastic side frame and the recess of the optical film envelops the at least one cantilever, wherein the connecting arm and the at least one cantilever extend from the elastic side frame in a vertical direction substantially perpendicular to a major surface of the optical film.

3. The backlight module as claimed in claim 2, wherein the at least one cantilever has a recess, and a third spacing is formed between the cantilever and the connecting arm.

4. The backlight module as claimed in claim 2, wherein the at least one cantilever includes two L-shaped structures with a recess therebetween.

5. The backlight module as claimed in claim 2, wherein the elastic side frame is made of metal, plastic, or complex materials.

6. The backlight module as claimed in claim 2, wherein the backlight module is a bottom lighting backlight module.

7. The backlight module as claimed in claim 2, wherein the connecting arm and the at least one cantilever are connected in the vertical direction substantially perpendicular to the major surface.

8. The backlight module as claimed in claim 2, wherein the optical film has a first horizontal direction and a second horizontal direction, and the cantilever faces to the optical film in the first horizontal direction and the extension portion faces to the optical film in the second horizontal direction.

9. The backlight module as claimed in claim 2, wherein the outer frame further includes a portion disposed between the elastic side frame and the optical film.

10. The backlight module as claimed in claim 2, wherein the elastic side frame, the connecting arm and the at least one cantilever are integrally formed.

11. The backlight module as claimed in claim 2, wherein the elastic side frame is disposed at two sides of the outer frame.

12. The backlight module as claimed in claim 11, wherein the at least one cantilever disposed on the elastic side frames disposed at two sides of the outer frame are symmetrical or asymmetrical.

13. The backlight module as claimed in claim 2, further comprising a plurality of lamps locating on the outer frame.

14. The backlight module as claimed in claim 13, wherein the lamps are cold cathode fluorescent lamps (CCFL) or light emitting diodes (LED).

15. A backlight module comprising:
an outer frame;
an elastic side frame disposed on at least one side of the outer frame;
a connecting arm disposed on the top of the elastic side frame;
at least one cantilever disposed on the connecting arm, wherein a first spacing is formed between the cantilever and the elastic side frame; and
at least one optical film having at least one recess, the at least one optical film being disposed on the top of the elastic side frame and the recess of the optical film envelops the at least one cantilever, wherein the connecting arm and the at least one cantilever extend from the elastic side frame in a vertical direction substantially perpendicular to a major surface of the optical film.

* * * * *